United States Patent [19]

Vargiu et al.

[11] 4,143,090

[45] Mar. 6, 1979

[54] HARDENABLE COMPOSITIONS COMPRISING AN UNSATURATED EPOXY ESTER AND AN ETHYLENICALLY UNSATURATED MONOMER

[75] Inventors: Silvio Vargiu, Casatenovo (Como); Beppino Passalenti, Lissone (Milan); Silvestro Pezzoli, Biassono (Milan), all of Italy

[73] Assignee: Societa' Italiana Resine S.I.R. S.p.A., Milan, Italy

[21] Appl. No.: 792,821

[22] Filed: May 2, 1977

[30] Foreign Application Priority Data

Apr. 30, 1976 [IT] Italy .............................. 22906 A/76

[51] Int. Cl.$^2$ ............................................. C08L 63/00
[52] U.S. Cl. .................................. 260/837 R; 260/836
[58] Field of Search ............................ 260/836, 837 R

[56] References Cited

U.S. PATENT DOCUMENTS

| | | | |
|---|---|---|---|
| 3,301,743 | 1/1967 | Fekete | 260/836 |
| 3,317,465 | 5/1967 | Doyle | 260/836 |
| 3,373,075 | 3/1968 | Fekete | 260/837 R |
| 3,377,406 | 4/1968 | Newey | 260/837 R |
| 3,564,074 | 2/1971 | Swisher | 260/836 |
| 3,634,542 | 1/1972 | Dowd | 260/836 |

*Primary Examiner*—Paul Lieberman

*Attorney, Agent, or Firm*—Sughrue, Rothwell, Mion, Zinn and Macpeak

[57] ABSTRACT

A hardenable composition comprising an unsaturated epoxy ester resin and an ethylenically unsaturated monomer copolymerizable with the latter, said monomer being present in the composition in an amount of from 0.4 to 2 parts by weight for each part by weight of said resin, and said resin being the reaction product of an unsaturated monocarboxylic acid or a monoester of an unsaturated bicarboxylic acid with the epoxidation product of epichlorohydrin and a novolak phenolic resin of the structural formula:

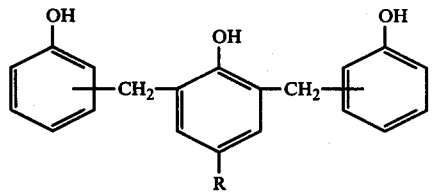

wherein R is an alkyl radical containing from 1 to 10 carbon atoms, the methylene bridges being bonded to the central phenol ring in the ortho- positions in relation to the hydroxyl group, and to the other phenol rings in the ortho- or para- positions in relation to the hydroxyl groups.

11 Claims, No Drawings

HARDENABLE COMPOSITIONS COMPRISING AN UNSATURATED EPOXY ESTER AND AN ETHYLENICALLY UNSATURATED MONOMER

The present invention relates to a composition hardenable by means of peroxides, which comprises an unsaturated epoxy ester and an ethylenically unsaturated monomer copolymerizable with the latter.

It is known in the art how to react a polyepoxide with an unsaturated monocarboxylic acid, such as for example acrylic or methacrylic acid. The reaction between the oxirane bridge of the polyepoxide and the carboxylic group of the unsaturated monocarboxylic acid leads to the formation of unsaturated epoxyesters soluble in styrene and the resulting solutions can be hardened by means of peroxide catalysts in the same way as conventional unsaturated polyester resins. Hardening occurs by cross-linking between the double bond of styrene and that of the unsaturated acid having reacted with the polyepoxide.

An unsaturated epoxyester known in the art is for example that which is obtained by reaction of methacrylic acid with the diglycidyl ether of 2,2-bis(4-hydroxyphenyl) propane and which corresponds to the formula:

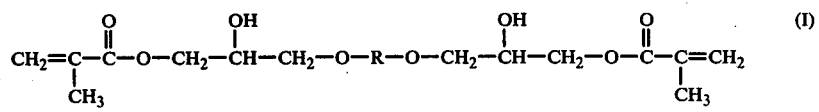

wherein R is the bisphenyl radical of 2,2-bis(4-hydroxyphenyl) propane.

The solution in styrene of this unsaturated epoxy ester hardens by means of peroxides to form hardened products having the characteristics proper to polyepoxides, in addition to those of conventional unsaturated polyester resins.

Also known in the art is the interaction between epoxy novolak resins and acrylic or methacrylic acid, yielding unsaturated epoxy esters whose solutions in styrene are also hardenable by means of peroxides. In this case, one generally obtains a higher density of cross-links by hardening, because the epoxy function is higher than that of the unsaturated epoxy ester (I). It is thus possible to improve some characteristics of the hardened products.

The present invention relates to a composition comprising an unsaturated epoxy ester and an ethylenically unsaturated monomer copolymerizable with the latter, in which said epoxy ester belongs to a new class, said composition yielding under the action of peroxides hardened products having improved properties.

Thus, according to one aspect of the present invention there is provided a hardenable composition comprising an unsaturated epoxy ester resin and an ethylenically unsaturated monomer copolymerizable with the latter, said monomer being present in the composition in an amount of from 0.4 to 2 parts by weight for each part by weight of said resin, and said resin being the reaction product of an unsaturated monocarboxylic acid or a monoester of an unsaturated bicarboxylic acid with the epoxidation product of epichlorohydrin and a novolak phenolic resin of the structural formula:

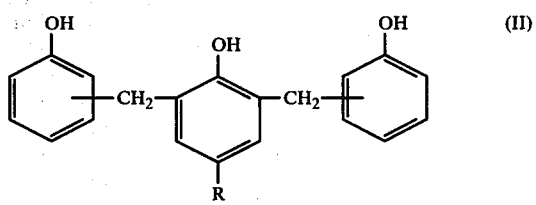

wherein R is an alkyl radical containing from 1 to 10 carbon atoms, the methylene bridges being bonded to the central phenol ring in the ortho-positions in relation to the hydroxyl group, and to the other phenol rings in the ortho- or para-positions in relation to the hydroxyl groups.

According to another aspect of the invention, there is provided a process for producing a hardened product, which comprises adding to the above-defined composition an organic peroxide or hydroperoxide, and hardening the resulting mixture.

The novolak phenolic resin (II) may be conveniently obtained by a process which comprises the following steps:

(a) formaldehyde and a para-substituted phenol

are brought into contact in a molar ratio of at least 2:1 and reacted in the presence of an inorganic base, at a temperature of at least 40° C., until the para-substituted phenol is substantially completely converted into the methylol derivative;

(b) an acid is added to the reaction products of step (a) in an amount at least equivalent to that of the inorganic base fed in in said step (a) and the methylol derivative is separated;

(c) phenol and the methylol derivative are brought into contact in a molar ratio of at least 2:1 and reacted in the presence of an acid catalyst, at a temperature of at least 100° C., while distilling off the water being formed, until the methylol groups are substantially completely reacted;

(d) the novolak phenolic resin (II) thus obtained is recovered from the reaction products of step (c).

Epoxidation of the novolak phenolic resin (II) by reacting the latter with epichlorohydrin in the presence of an alkali metal hydroxide, may be carried out as follows:

A solution of the resin (II) in epichlorohydrin is prepared, maintaining the ratio between the moles of epichlorohydrin and the number of phenolic hydroxy groups of resin (II) at a value of from 3:1 to 12:1, and aqueous alkali metal hydroxide is gradually added to the solution until the number of moles of said alkali metal hydroxide is equivalent, or about equivalent to the number of phenolic hydroxy groups of said resin (II).

The reaction is preferably carried out at a temperature of from 60° to 80° C. during the addition of the alkali metal hydroxide, distilling off water from the reaction medium in the form of an azeotropic mixture with epichlorohydrin and recycling the distilled epichlorohydrin, and maintaining at all times the water content of the reaction medium at a value of from 0.5 to 2.5% by weight and the pH at a value of from 7 to 8.

Upon completion of the addition of the aqueous alkali metal hydroxide, the water is completely distilled off from the reaction medium and the epoxidized novolak resin is recovered.

Operating according to the procedure described, one obtains a practically complete epoxidation of the phenolic hydroxy groups of resin (II), while avoiding, or at least substantially reducing the side reactions.

The properties of the epoxy novolak resin are reported in the following experimental example, together with those of the novolak phenolic resin (II).

The epoxy novolak resin is then reacted with an unsaturated monocarboxylic acid or a monoester of an unsaturated bicarboxylic acid, generally chosen from acrylic, methacrylic, crotonic and itaconic acids, methyl monomaleate and methyl monofumarate.

Preferably, the reagents are reacted at a temperature of from 120° to 150° C. for a period of from 1 to 6 hours. Operation is generally carried out in the presence of a catalyst chosen from alkali and alkaline earth metal compounds, such as sodium acetate, ammonium, sodium, potassium and lithium carbonates, or carbonates or acetates of alkaline earth metals, such as calcium and magnesium carbonates or acetates. Satisfactory results are obtained when using from 1 to 6 moles of catalyst for each 100 moles of unsaturated acid, or of monoester of unsaturated bicarboxylic acid.

Moreover, the number of moles of unsaturated monocarboxylic acid or of monoester of unsaturated bicarboxylix acid introduced into the reaction medium is preferably equivalent, or about equivalent to the number of epoxy groups of epoxy novolak resin.

In practice, the reaction is continued until the acid value of the reaction medium is equal to or lower than 10.

The unsaturated epoxy ester thus obtained is mixed with styrene, or another known unsaturated monomer capable of reacting with the conventional unsaturated polyester resins, such as vinyltoluene, alpha-methylstyrene, methylmethacrylate or vinylcyclohexene.

The preferred composition of the present invention contains from 0.6 to 1.5 parts by weight of ethylenically unsaturated monomer for each part by weight of unsaturated epoxy ester.

The composition may be hardened by using organic peroxides or hydroperoxides, such as methyl ethyl ketone peroxide, cyclohexanone peroxide, benzoyl peroxide, cumene hydroperoxide or other peroxides conventionally used in the art for hardening unsaturated polyester resins. The peroxide or hydroperoxide is preferably added in an amount of from 0.2 to 4 parts by weight for each 100 parts by weight of the sum of said epoxy ester resin and said monomer.

Conventional additives, such as fillers, pigments and hardening accelerators may be present in the composition and/or added to the composition in the process for producing hardened products.

Examples of suitable hardening accelerators are dimethylaniline and trimethylbenzylammonium chloride, which may be used in amounts of from 0.1 to 2 parts by weight for each 100 parts by weight of the sum of said epoxy ester resin and said monomer.

The accelerators may also be chosen from metal salts, such as cobalt and vanadium salts, especially the naphthenates and octoates of cobalt, vanadium and vanadyl, or other accelerators conventionally used in the art for hardening unsaturated polyester resins. These metallic accelerators are preferably used in amounts of from 0.02 to 2 parts by weight (as metal) for each 100 parts by weight of the sum of said epoxy ester resin and said monomer.

The composition of the present invention is particularly suitable in the field of coatings, in the field of mastics, in the production of reinforced plastics, in the electrotechnical field and in the field of inks and paints hardenable by ultra violet radiations.

EXAMPLE

Preparation of the Novolak Phenolic Resin

Into a reactor furnished with an agitator, a steam heating system, a level gauge, a reservoir for feeding in the reagents, a condenser, a separating vessel, a reflux pipe for the condensate and a collecting vessel for the distillate, there are fed in 426.7 parts by weight of para-tert-butylphenol and 604 parts by weight of a 36 wt.% aqueous solution of formaldehyde, the molar ratio between the two reagents being equal to 2.5:1.

The temperature is brought to 60° C. and 190 parts by weight of a 30 wt.% aqueous solution of sodium hydroxide are gradually added to the agitated mass.

At the end of the addition of the hydroxide the molar ratio of para-tert-butylphenol to sodium hydroxide is equal to 2:1.

After this addition the temperature is maintained at the value shown until the content of free formaldehyde in the reaction medium is reduced to 4–4.5% by weight.

119 parts by weight of a 75 wt.% aqueous solution of phosphoric acid are then added and agitation is maintained until neutralization is complete.

The agitator is then stopped and an aqueous phase containing unreacted formaldehyde in addition to sodium phosphates, and an organic phase containing the methylol derivative of para-tert-butylphenol, are separated.

The aqueous phase is discharged and 360 parts by weight of toluene are added to the organic phase (720 parts by weight).

The toluene solution thus obtained has the following characteristics:
- weight % of dry matter: 52
- viscosity at 25° C. in cps: 25
- free para-tert-butylphenol: absent This last determination is carried out by gas-chromatographic analysis.

737 parts by weight of phenol containing 32 parts by weight of oxalic acid are heated to 100° C. and the toluene solution of the methylol intermediate is gradually added to the heated phenol over a period of 3 hours.

During this period of time the mass is kept boiling and the water is distilled off in the form of an azeotrope with toluene, and continuously discharged. The distilled toluene is recycled into the reaction medium.

The temperature of the mass rapidly rises to 120°–125° C. during the addition of the toluene solution and remains at these values up to the end of the said addition, the molar ratio between phenol and para-tertbutylphenol in the reaction medium being then equal to 2.7:1.

After the addition of the toluene solution the temperature is maintained at the values shown for 30 minutes and the mass is then cooled to 30°–40° C.

At this temperature the oxalic acid, dispersed in the reaction medium, is removed by filtering.

The resulting solution has the following characteristics:
 weight % of dry matter: 64
 viscosity at 40° C. in cps: 900
 weight % of free phenol: 16

This last determination is carried out by gas-chromatography.

The solution is subjected to distillation at atmospheric pressure, distilling off 253 parts by weight of toluene containing small amounts of phenol.

The residue is distilled by the thin film method at a pressure of 3 mm Hg to remove the residual toluene and any unreacted phenol. At the base of the evaporator about 1000 parts by weight of a novolak phenolic resin having the following characteristics are recovered:
 appearance: solid
 melting point in a capillary (° C.): 74
 viscosity at 25° C. in a 50 wt.% solution in ethanol (cps): 33
 pH in 50 wt.% ethanol solution: 4
 Gardner melting colour: 6
 free phenol (gas-chromatography): <0.5
 free para-tert-butylphenol (gas-chromatography): absent Moreover, the nuclear magnetic resonance spectrum gives the following results:
 $\overline{Mn}(OM)$ = average numerical molecular weight: 364
 $\overline{n}$ = average number of hydroxyl groups per molecule: 3.0
 $R_A$ = average number of aromatic protons per ring: 3.0
 $R_{MB}$ = average number of methylene bridges per benzene ring: 0.6
 ortho-ortho' isomers: 5%
 ortho-para isomers: 95%
 para-tert-butylphenol/phenol molar ratio: 1:2

Preparation of the Epoxy Novolak Resin

There is used an apparatus comprising a reaction vessel (flask), a mechanical agitator, an electric heater, a distillation column fitted with a cooler, a separating flask for the epichlorohydrin-water distillate with a syphon for recycling the heavy epichlorohydrin phase into the reaction vessel, and a device for regulating the pressure in the apparatus.

3890 parts by weight of epichlorohydrin and 728 parts by weight of the novolak phenolic resin previously described are introduced into the flask.

The molar ratio between epichlorohydrin and the novolak is thus equal to about 21:1 and the ratio between the moles of epichlorohydrin and the number of phenolic hydroxy groups of the novolak is 7:1.

The pressure in the apparatus is brought to 160 mm Hg and the mass is heated to 70° C.

480 parts by weight of a 50 wt.% aqueous solution of sodium hydroxide are gradually added over a period of 6 hours. Upon completion of this addition, the ratio between the moles of sodium hydroxide and the number of hydroxy groups of novolak is equal to about 1:1.

During the addition of the aqueous sodium hydroxide, the reaction temperature is about 70° C. and the water is removed in the form of an azeotropic mixture with epichlorohydrin, the vapors are condensed and the liquid epichlorohydrin phase is recycled. Under these conditions, the average amount of water present in the reaction medium is of the order of 1% by weight and the pH value is about 7.5.

At the end of the addition of aqueous sodium hydroxide, the mass is kept boiling from a further 15 minutes, the pressure is then brought to atmospheric pressure and the temperature to 80°–85° C.

600 parts by weight of water are gradually added to the agitated mass, the aqueous phase is separated from the organic phase and the latter is submitted to distillation at subatmospheric pressure to remove the unreacted epichlorohydrin. The distillation residue is filtered, using diatomaceous earth as a filter aid.

890 parts by weight of an epoxy novolak resin having the following characteristics are thus obtained:
 epoxy equivalent: 196
 volatile substances (% by weight): 1.5
 chlorine (weight %): 0.8
 melting point in a capillary (° C.): 45
 epoxy function: 2.7

By epoxy equivalent are intended the grams of epoxy novolak containing one epoxy group; by chlorine is intended the content of hydrolizable and non-hydrolizable chlorine present in the epoxy novolak and the epoxy function is the number of epoxy groups per molecule of epoxy novolak resin.

Preparation of the Unsaturated Epoxy Ester

There is used an apparatus comprising a flask furnished with an agitator, a condenser, a thermometer and a device for injecting inert gas.

784 parts by weight of the epoxy novolak previously described, 500 ppm of a mixture in equal amounts of hydroquinone and dimethylbenzylammonium chloride and 100 ppm of triphenylphosphite, are fed into the flask. 0.15 parts by weight of sodium carbonate are also added.

The temperature is brought to 120°–130° C. and 280 parts by weight of acrylic acid are gradually added, taking care that the temperature will not exceed 150° C.

At the end of the addition of acrylic acid, the ratio between the number of epoxy groups and the moles of acrylic acid is equal to 1:0.97.

The temperature is maintained at the given value until the acid value of the reaction medium is 9, the acid value being intended as the number of milligrams of potassium hydroxide necessary to neutralize one gram of unsaturated epoxy ester.

The mass is then cooled to 80° C. and styrene monomer is added until its amount is of 29% by weight in the resulting solution.

This solution in styrene has a Gardner viscosity of X+1/3, as measured at 25° C.

The Gardner viscosity of a similar solution containing 40% by weight of styrene is equal to F, still measured at 25° C.

Finally, a solution of the unsaturated epoxy ester in styrene in a 45:55 molar ratio is prepared and this solution is used in the following hardening tests.

Hardening Tests 0.4 parts by weight of cobalt octoate containing 6% by weight of metallic cobalt and 1.5 parts by weight of methyl ethyl ketone peroxide are added to 100 parts by weight of the solution of unsaturated epoxy ester in styrene.

Hardening is carried out for 15 days at 20° C. The characteristics of the hardened test-pieces are reported in the Table under A.

A part of the test-pieces thus obtained are submitted to a thermal treatment at 150° C. for 200 hours and the remaining part at 150° C. for 24 hours. The characteristics of the thus treated test-pieces are reported in the Table under B and C.

Table

|  | A | B | C |
| --- | --- | --- | --- |
| Bending strength (kg/cm$^2$) | 645 | 644 | 703 |
| Flexural modulus (kg/cm$^2$) (ASTM-D-790) | 20900 | 30200 | 29900 |
| Tensile strength (kg/cm$^2$) | 431 | 558 | 561 |
| Tensile modulus (kg/cm$^2$) (ASTM-D-638) | 22400 | 30500 | 34700 |
| Elongation (%) | 3.8 | 1.7 | 1.9 |
| Impact resistance (kg.cm/cm$^2$) | 1.85 | 1.7 | 1.5 |
| H.D.T. (° C) | 51 | 123 | 111 |
| Water absorption (% by weight) | 0.18 | 0.16 | 0.18 |
| Barcol hardness (ASTM-D-1706) | 40 | 53 | 50 |

All the determinations have been carried out according to the ASTM standards.

The results reported in the Table clearly show that the long stays of the test-pieces at elevated temperature do not affect the good characteristics of resistance to mechanical stress.

We claim:

1. A hardenable composition comprising an unsaturated epoxy ester resin and an ethylenically unsaturated monomer copolymerizable with the latter, said monomer being present in the composition in an amount of from 0.4 to 2 parts by weight for each part by weight of said resin, and said resin being the reaction product of an unsaturated monocarboxylic acid or a monoester of an unsaturated bicarboxylic acid with the epoxidation product of epichlorohydrin and a novolak phenolic resin of the structural formula:

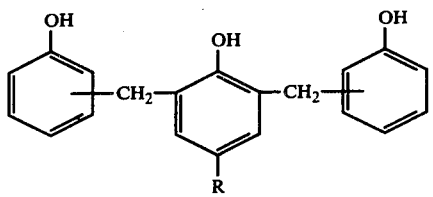

wherein R is an alkyl radical containing from 1 to 10 carbon atoms, the methylene bridges being bonded to the central phenol ring in the ortho-positions in relation to the hydroxyl group, and to the other phenol rings in the ortho- or para-positions in relation to the hydroxyl groups.

2. The hardenable composition of claim 1, wherein said unsaturated monocarboxylic acid is selected from the group consisting of acrylic, methacrylic, crotonic and itaconic acids.

3. The hardenable composition of claim 1, wherein said monoester is selected from the group consisting of methyl monomaleate and methyl monofumarate.

4. The hardenable composition of claim 1, wherein said monomer is selected from the group consisting of styrene, vinyltoluene, alpha-methylstyrene, methyl methacrylate and vinylcyclohexene.

5. The hardenable composition of claim 1, wherein said monomer is present in an amount of from 0.6 to 1.5 parts by weight for each part by weight of said epoxy ester resin.

6. The hardenable composition of claim 1, wherein said monomer is styrene.

7. A process for producing a hardened product, which comprises adding a catalytic amount of organic peroxide or hydroperoxide to a hardenable composition comprising an unsaturated epoxy ester resin and an ethylenically unsaturated monomer copolymerizable with the latter, said monomer being present in the composition in an amount of from 0.4 to 2 parts by weight for each part by weight of said resin, and said resin being the reaction product of an unsaturated monocarboxylic acid or a monoester of an unsaturated bicarboxylic acid with the epoxidation product of epichlorohydrin and a novolak phenolic resin of the structural formula:

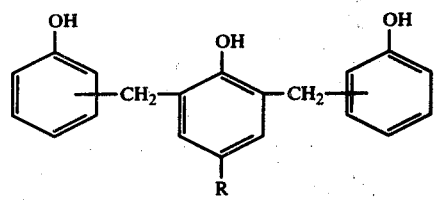

wherein R is an alkyl radical containing from 1 to 10 carbon atoms, the methylene bridges being bonded to the central phenol ring in the ortho-positions in relation to the hydroxyl group, and to the other phenol rings in the ortho- or para-positions in relation to the hydroxyl groups, and hardening the resulting mixture.

8. The process of claim 7, wherein said organic peroxide or hydroperoxide is selected from the group consisting of methyl ethyl ketone peroxide, cyclohexanone peroxide, benzoyl peroxide and cumene hydroperoxide.

9. The process of claim 7, wherein said peroxide or hydroperoxide is added in an amount of from 0.2 to 4 parts by weight for each 100 parts by weight of the sum of said epoxy ester resin and said monomer.

10. The process of claim 7, wherein a hardening accelerator selected from the group consisting of dimethylaniline and trimethylbenzylammonium chloride is added to the composition in an amount of from 0.1 to 2 parts by weight for each 100 parts by weight of the sum of said epoxy ester resin and said monomer.

11. The process of claim 7, wherein a hardening accelerator selected from the group consisting of naphthenates and octoates of cobalt, vanadium and vanadyl is added to the composition in an amount of from 0.02 to 2 parts by weight (as metal) for each 100 parts by weight of the sum of said epoxy ester resin and said monomer.

* * * * *